(12) United States Patent
Kriplani et al.

(10) Patent No.: US 8,448,104 B1
(45) Date of Patent: May 21, 2013

(54) METHOD AND AN APPARATUS TO PERFORM STATISTICAL STATIC TIMING ANALYSIS

(75) Inventors: Harish Kriplani, Saratoga, CA (US); Shiang-Tang Huang, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 564 days.

(21) Appl. No.: 12/345,686

(22) Filed: Dec. 30, 2008
(Under 37 CFR 1.47)

Related U.S. Application Data

(62) Division of application No. 11/159,990, filed on Jun. 22, 2005, now Pat. No. 7,487,475.

(51) Int. Cl.
*G06F 17/50* (2006.01)

(52) U.S. Cl.
USPC ............... 716/56; 716/54; 716/113; 703/19

(58) Field of Classification Search
USPC ........................ 716/54, 56, 113; 703/19
See application file for complete search history.

(56) References Cited

U.S. PATENT DOCUMENTS

| | | | | |
|---|---|---|---|---|
| 4,924,430 A * | 5/1990 | Zasio et al. | ............ | 716/108 |
| 5,365,463 A * | 11/1994 | Donath et al. | ............ | 703/19 |
| 5,383,167 A | 1/1995 | Weil | | |
| 6,430,729 B1 * | 8/2002 | Dewey et al. | ............ | 716/115 |
| 6,526,541 B2 * | 2/2003 | Sugibayashi | ............ | 716/113 |
| 6,594,805 B1 * | 7/2003 | Tetelbaum et al. | ............ | 716/115 |
| 6,910,194 B2 * | 6/2005 | Mielke et al. | ............ | 716/113 |
| 7,000,205 B2 * | 2/2006 | Devgan et al. | ............ | 716/113 |
| 7,086,023 B2 * | 8/2006 | Visweswariah | ............ | 716/108 |
| 7,089,143 B2 * | 8/2006 | Foreman et al. | ............ | 702/125 |
| 7,149,999 B2 * | 12/2006 | Kahng et al. | ............ | 716/53 |
| 7,239,997 B2 * | 7/2007 | Yonezawa | ............ | 703/19 |
| 7,280,939 B2 * | 10/2007 | Hathaway et al. | ............ | 702/182 |
| 7,286,247 B2 * | 10/2007 | Archie et al. | ............ | 356/625 |
| 7,474,999 B2 * | 1/2009 | Scheffer | ............ | 703/14 |
| 2004/0002844 A1 * | 1/2004 | Jess et al. | ............ | 703/14 |
| 2004/0122642 A1 * | 6/2004 | Scheffer | ............ | 703/14 |

OTHER PUBLICATIONS

S.W. Director and W. Maly, "Advances in CAD for VLSI, vol. 8, Statistical Approach to VLSI", 1999, pp. 1-391, Evier Science B.V., Amsterdam, Netherlands.

Louis Scheffer, Luciano Lavagno, Grant Martin, "EDA for IC Implementation, Circuit Design, and Process Technology", 2006, pp. 6-12 through 6-17, CRC Press, Florida, USA.

E. Jacobs and M.R.C.M. Berkelaar, "Gate Sizing Using a Statistical Delay Model", Proceedings of Design and Test Europe, 2000, pp. 283-290.

(Continued)

*Primary Examiner* — Naum Levin
(74) *Attorney, Agent, or Firm* — Alford Law Group, Inc.; William E. Alford

(57) ABSTRACT

A method and an apparatus to perform statistical static timing analysis have been disclosed. In one embodiment, the method includes performing statistical analysis on performance data of a circuit from a plurality of libraries at two or more process corners using a static timing analysis module, and estimating performance of the circuit at a predetermined confidence level based on results of the statistical analysis during an automated design flow of the circuit without using libraries at the predetermined confidence level.

12 Claims, 7 Drawing Sheets

OTHER PUBLICATIONS

C. Visweswariah, K. Ravindran, K. Kalafala, S.G. Walker, and S. Narayan, "First-order Incremental Block-based Statistical Timing Analysis", Proceedings of the ACM/IEEE Design Automation Conference, 2004, pp. 331-336.

A. Agarawal, V. Zolotov, and D.T. Blaauw, "Statistical Timing Analysis Using Bounds and Selective Enumeration", IEEE Transactions Computer-Aided Design Integrated Cuircuits & Systems, 2003, vol. 22, pp. 1243-1260.

H. Chang and S.S. Sapatnekar, "Statistical Timing Analysis Considering Spatial Correlations Using a Single PERT-like Traversal", Proceedings of the IEEE/ACM International Conference on Computer-Aided Design, 2003, pp. 621-625.

* cited by examiner

Modeling inter-chip process variation

METHOD AND AN APPARATUS TO PERFORM STATISTICAL STATIC TIMING ANALYSIS

REFERENCE TO RELATED APPLICATION

This application claims the benefit of and is a divisional application of U.S. patent application Ser. No. 11/159,990 filed on Jun. 22, 2005 by inventors Harish Kriplani, et al., entitled, SYSTEMS, METHODS, AND APPARATUS TO PERFORM STATISTICAL STATIC TIMING ANALYSIS (as amended); which claims the benefit of U.S. Provisional Application No. 60/619,356, filed on Oct. 15, 2004.

TECHNICAL FIELD

The present invention relates to electronic design automation (EDA), and more particularly, to performing statistical static timing analysis in EDA.

BACKGROUND

In complementary metal oxide semiconductor (CMOS) technologies, process variations during manufacturing have a significant impact on circuit performance, such as timing. The effect of these variations worsens as minimum feature sizes scale down and as circuit complexity and die sizes increase. In many of today's integrated circuit (IC) design implementation flows, variability in devices and interconnects is modeled by timing analysis and optimization of a design at multiple process corners.

Generally speaking, timing analysis calculates circuit timing delays and ensures that those delays are within bounds as specified by user constraints. There are two major types of timing analyses, namely, static timing analysis and dynamic timing analysis. Static timing analysis basically calculates all of the individual delays associated with different portions of a circuit and then generates a report detailing the minimum and maximum delays associated with each possible path and whether those delays meet user constraints. On the other hand, dynamic timing analysis typically specifies an event that may occur sometime within a certain time period and then determines the timing along different paths of the circuit in response to the event. In other words, dynamic timing analysis is event-driven.

In conventional static timing analysis, models at various process corners have significant pessimism built into them. Generally speaking, pessimism in the current context refers to the extra timing margin (e.g., extra delay margin) added to make it more likely that a device in the circuit is going to satisfy specified timing requirements.

As the built-in pessimism of the models is reduced, the reported worst slack for the circuit typically improves. The worst slack is a function of circuit delay and more description of which is provided below. This results in faster time to market and lower timing closure effort. However, improvements in faster time-to market and less design time come at the cost of some loss in yield. Reducing the pessimism may cause a lower yield. Thus, information regarding the relationship between circuit performance (e.g., worst slack) and yield is useful in making decisions on business and design tradeoff.

Currently, reduction in model pessimism also requires new libraries that contain performance data (e.g., timing) of the process to be generated. Generating new libraries is time consuming and costly because these new libraries are process-specific and they have to be ordered from foundries and/or library vendors that support the specific process. In particular, when early feedback on timing of the design is needed, it is inconvenient and inefficient to order a new set of libraries.

Moreover, a new set of libraries has to be ordered for each distinct confidence level the circuit designers are interested in. A confidence level can be expressed as a percentage of circuits made using a predetermined fabrication process that meet some predetermined specification. For example, a confidence level of 90% indicates that about 90% of the circuits made using the predetermined fabrication process meet the specification. The percentage of circuits meeting a specification may be referred to as the yield of the circuits. Furthermore, a confidence factor k may be defined to correspond to a given confidence level. For example, k of 3 may represent a confidence level of about 99.87%.

Process variations may be broadly categorized into inter-chip and intra-chip process variations. A chip includes one or more semiconductor circuits fabricated on a piece of silicon. Inter-chip process variations are chip-to-chip variations. The chips may be on the same wafer, such as chip 101 and 103 on wafer 109 shown in FIG. 1A. Alternatively, the chips may be on different wafers, such as chip 131 on wafer 130a and chip 133 on wafer 130b in FIG. 1B. Furthermore, the chips may be in different lots, such as chip 141 in lot 140a and chip 143 on lot 140b in FIG. 1C. Inter-chip process variations are typically modeled by multiple libraries at various process corners, such as best case (BC) 110, typical case (TC) 120 and worst case (WC) 130 libraries, as shown in FIG. 1D.

In contrast, intra-chip process variations are within chip variations. For example, the intra-chip process variation may be demonstrated by measuring performance (e.g., timing) of various components within the same chip. Referring back to FIG. 1A, an exploded view of the chip 103 is shown as the chip 105. Delays through the NAND gates 107a and 107b may be measured to characterize the intra-chip process variation within the chip 105. Intra-chip process variations are usually smaller than inter-chip process variations. Although inter-chip process variation previously dominated process variation, intra-chip process variation has become more significant as semiconductor processing technologies enter the sub-micron era. For many sub-micron semiconductor processing technologies (e.g., 90 nm processes), intra-chip variation may affect circuit and/or device matching within a chip.

Intra-chip process variations are typically modeled by different minimum and maximum delays for gates and interconnects on a chip. Conventionally, intra-chip process variations may be specified around each of the inter-chip variation corners of interest, such as shown in FIG. 2 for example. Intra-chip variations may be specified in a number of ways, such as scaling nominal delays, which are calculated at associated inter-chip variation corner, to minimum and maximum values by constants, or using user specified minimum and maximum operating parameters or operating conditions, and scaling factors (also known as k-factors) present in the libraries. Another conventional way to specify intra-chip variations is to use two libraries around each inter-chip variation corner and to calculate minimum delays from one library and maximum delays from the other library.

Conventionally, an early path segment is a series of gates and interconnects for which all delay arcs among the series of gates and interconnects are analyzed at their minimum delay values. A late path segment is a series of gates and interconnects for which all delay arcs among the series of gates and interconnects are analyzed at their maximum delay values. In the current document, the term path is used to describe an early and a late path segment pair that leads to constraint violation at an end point in a circuit. For notational convenience, an early or late path segment is also referred to as an early or late path.

Slack due to setup violation in a circuit is defined by the following equation:

$$Slack_{setup} = PathDelay_{early} - PathDelay_{late} - setup + adj,$$

where $PathDelay_{early}$ is the sum of minimum delays along an early path segment and $PathDelay_{late}$ is the sum of maximum delays along a late path segment. The parameter "adj" is includes adjustment for launching and capturing clocks (i.e., period adjustment) as well as other constant pessimism that a user wants to include in timing analysis. Slack due to hold violation may be defined in a similar fashion as follows:

$$Slack_{hold} = PathDelay_{early} - PathDelay_{late} - hold + adj.$$

If setup and hold values are factored into $PathDelay_{late}$, then slack due to either setup or hold violations may be expressed as follows:

$$Slack = PathDelay_{early} - PathDelay_{late} + adj \quad (A).$$

If $PathDelay_{early}$ and $PathDelay_{late}$ are expressed as sums of individual arc delays, then equation (A) may be rewritten as follows:

$$Slack = \Sigma_i Delay_{early,i} - \Sigma_j Delay_{late,j} + adj \quad (B),$$

where i and j are indices of the individual delay arc within the path.

Conventionally, static timing analysis assigns minimum and maximum delays to all delay arcs within a path and uses the minimum and maximum delays for analysis of the early and late paths, respectively. For a given end point, however, if early and late paths share a portion of a clock network, then the analysis introduces pessimism equal to the sum of the differences of minimum and maximum arc delays for the shared clock network. The process of removing this pessimism due to overlap in the clock network is commonly referred to as clock path pessimism removal (CPPR).

To aid in the understanding of statistical static timing analysis, a general overview of some statistics principles is provided below. Given n partially correlated, normal random variables $X_1, X_2, \ldots X_n$, mean and variance of their sum are given as follows:

$$\mu_{sum} = \mu_{X1} + \mu_{X2} + \ldots + \mu_{Xn} \quad (C);$$

$$Var_{sum} = r(\Sigma \sigma_{Xi})^2 + (1-r)(\Sigma \sigma_{Xi}^2) \quad (D),$$

where $\mu_{Xi}$ and $\sigma_{Xi}$ are mean and standard deviation of random variable $X_i$ ($1 \leq i \leq n$) and r is the correlation coefficient between any pair of variables ($0 \leq r \leq 1$). Furthermore, given partially correlated, normal random variables X and Y, and Z=X-Y, the mean and variance of Z are:

$$\mu_Z = \mu_X - \mu_Y \quad (E)$$

$$Var_Z = (1+r)(\sigma_X^2 + \sigma_Y^2) - r(\sigma_X + \sigma_Y)^2 \quad (F), \text{ respectively,}$$

where $\mu_X, \mu_Y, \sigma_X$ and $\sigma_Y$ are means and standard deviations of variables X and Y, respectively, and r is their correlation coefficient. The standard deviation of Z is equal to the square root of $Var_Z$.

SUMMARY

The present invention includes a method and an apparatus to perform statistical static timing analysis. In one embodiment, the method includes performing statistical analysis on performance data of a circuit from a plurality of libraries at two or more process corners using a static timing analysis module, and estimating performance of the circuit at a predetermined confidence level based on results of the statistical analysis during an automated design flow of the circuit without using libraries at the predetermined confidence level.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and an apparatus to perform statistical static timing analysis are described. In the following description, numerous specific details are set forth. However, it is understood that embodiments of the invention may be practiced without these specific details. In other instances, well-known components, structures, and techniques have not been shown in detail in order not to obscure the understanding of this description.

Reference in the patent description to "one embodiment" or "an embodiment" means that a particular feature, structure, or characteristic described in connection with the embodiment is included in at least one embodiment of the invention. The appearances of the phrase "in one embodiment" in various places in the patent description do not necessarily all refer to the same embodiment.

According to some embodiments of the present invention, circuit performance (e.g., worst slack, hold slack, setup slack) is predicted as a function of yield, without requiring additional libraries at a predetermined confidence level. In one embodiment, statistical analysis is performed on performance data of a circuit using a static timing analysis module. The performance data may be retrieved from some libraries associated with at least two process corners. Then the performance of the circuit at the predetermined confidence level is estimated based on the results of the statistical analysis during an automated design flow of the circuit without using additional libraries associated with the predetermined confidence level.

All delays in a design timed with libraries at one of the process corners and with parasitics extracted at a corresponding process corner may exhibit the delay characteristics discussed above. For a design, a design corner refers to a process corner device library and parasitics associated with corresponding process corner. However, the process corner device library may not be of a desired predetermined confidence level. In this case, the performance of a circuit can be estimated at a predetermined confidence level using the performance data retrieved without using libraries associated with a process corner corresponding to the predetermined confidence level.

In some embodiments, the estimation of the performance of the circuit at the predetermined confidence level includes determining the inter-chip process variation, the intra-chip process variation, and/or a combination of both at the predetermined confidence level, which may correspond to an inter-chip constant ($k_{inter}$) and/or an intra-chip constant ($k_{intra}$). Thus, in the following sections, details of the determination of each of the above process variations are described, followed by a description of the application of the statistical static timing analysis in EDA according to some embodiments of the invention.

Inter-Chip Process Variation

Figure 1A:
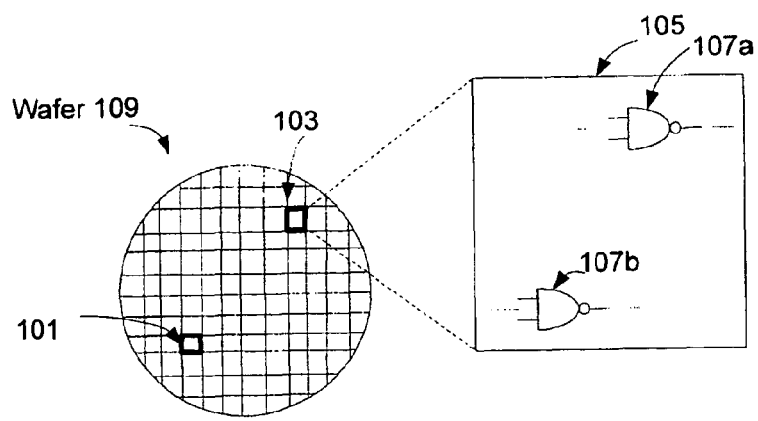
FIGS. 1A-1C illustrate some exemplary chips on various wafers.
Figure 1B:
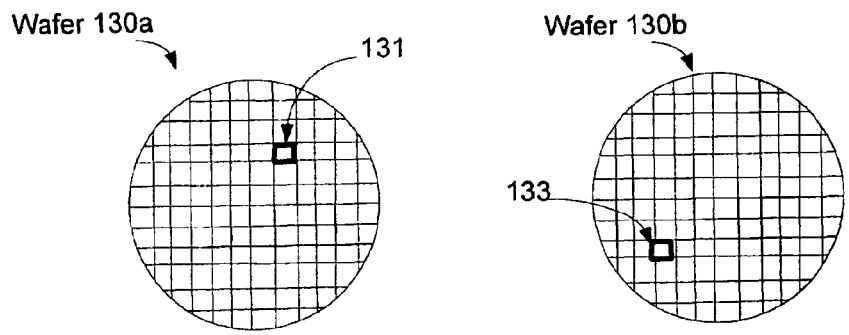
Figure 1C:
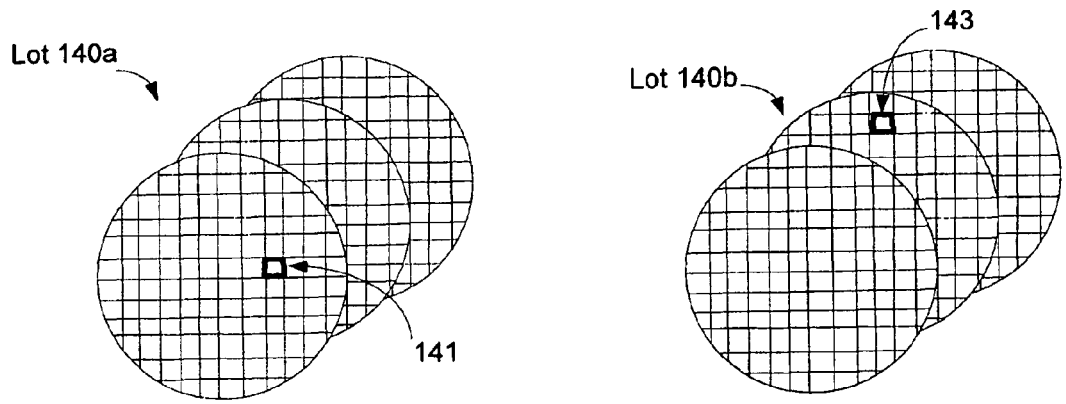
Figure 1D:
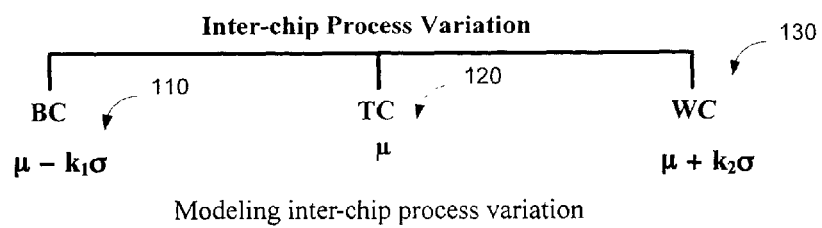
FIG. 1D illustrates one conventional approach to model inter-chip process variation.

As mentioned above, inter-chip process variation is typically modeled by BC, TC, and WC libraries, which respectively represent the best, typical, and worst process corners (i.e., the operating corners of the process space). In other words, if the mean and standard deviation of a performance parameter in the device library (e.g., delays) are denoted by $\mu$ and $\sigma$, these libraries typically represent the following data points: ($\mu - k_1 \sigma$), $\mu$, and ($\mu + k_2 \sigma$), where $k_1$ and $k_2$ correspond to the confidence levels (library confidence levels) associated with these libraries. Here, $k_1$ and $k_2$ are constants available from foundries and/or library vendors. One exemplary embodiment of data points ($\mu - k_1 \sigma$) 110, $\mu$ 120, and ($\mu + k_2 \sigma$) 130 is shown in FIG. 1D.

In one embodiment, given $k_1$ and $k_2$, the probabilities of a data point being less than or equal to ($\mu - k_1 \sigma$), $\mu$, and ($\mu + k_2 \sigma$) values may be determined using standard normal distribution tables. These probabilities are hereinafter referred to as $P_{BC}$, $P_{TC}$ and $P_{WC}$, respectively. These probabilities represent the likelihood of a delay being less than or equal to the values computed at the BC, TC, and WC design corners, respectively. As mentioned above, path delays in a design may be computed as the sum of individual arc delays. The probabilities of path delay being less than or equal to the path delay of the BC is $P_{BC}$. The probabilities of path delay being less than or equal to the path delay of the TC is $P_{TC}$. The probabilities of path delay being less than or equal to the path delay of the WC is $P_{WC}$. This is because inter-chip variation represents chip-to-chip variation and all delays within the same chip will be fully correlated. Note that delay variation due to intra-chip variation is discussed below.

In some embodiments, $PathDelay_{early}$ and $PathDelay_{late}$ are normally distributed and fully correlated. Therefore, from equation (A), slack is also normally distributed. The mean ($\mu_{slack}$) and standard deviation ($\sigma_{slack}$) of slack can be determined using the following equations:

$$\mu_{slack} - k_1 \sigma_{slack} = slack_{BC}$$

$$\mu_{slack} = slack_{TC}$$

$$\mu_{slack} + k_2 \sigma_{slack} = slack_{WC},$$

where $slack_{BC}$, $slack_{TC}$, $slack_{WC}$ are values of slack for the path, computed at the BC, TC and WC design corners, respectively. The confidence factors $k_1$, and $k_2$ corresponding to library confidence levels are provided by the respective libraries.

For modeling inter-chip process variation, the above equations for a given path can be solved for $\mu_{slack}$ and $\sigma_{slack}$ when at least two design corners are provided. It is because at least two equations involving the two unknown variables are needed to solve for the two unknown variables. Alternatively, one may use the least mean square (LMS) approach ($\sigma_{slack} > 0$) to solve for $\mu_{slack}$ and $\sigma_{slack}$.

Using $\mu_{slack}$ and $\sigma_{slack}$, the value of slack at any confidence level may be easily computed. One can look up the value of the constant 'k' that corresponds to a predetermined confidence level from the standard normal distribution tables. For example, k is equal to three for a confidence level of about 99.87%. Slack at a confidence level corresponding to k is $\mu_{slack} + k \sigma_{slack}$ if the confidence level is larger than 50%, or $\mu_{slack} - k \sigma_{slack}$ otherwise.

Figure 3A:
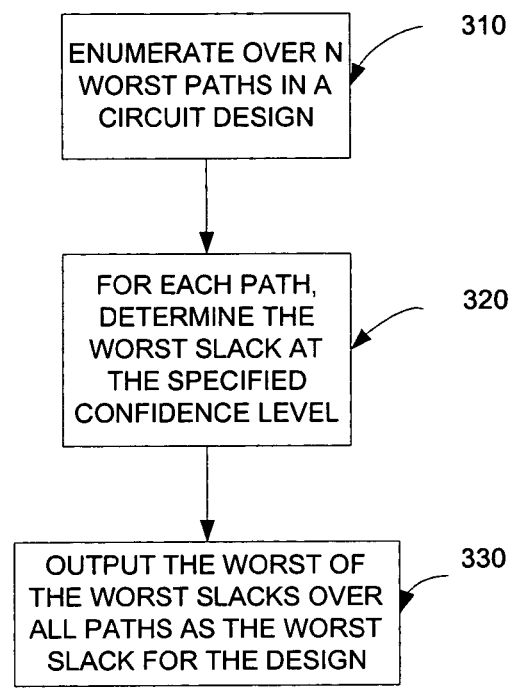
FIG. 3A illustrates a flow diagram of one embodiment of a process to determine the worst slack of a circuit.

The above technique can be used to determine a variety of performance parameters (e.g., worst slack) of a specific path in a circuit at a given confidence level. Note that performance parameters of different paths may have different means and standard deviations. By determining the values of a performance parameter for some or all paths in a circuit, the value of the performance parameter for the circuit can be determined. FIG. 3A illustrates a flow diagram of one embodiment of a process to determine the worst slack of a circuit at a predetermined confidence level. The process may be performed by processing logic that may comprise hardware (e.g., circuitry, dedicated logic, etc.), software (such as an EDA tool, operable to run on a general-purpose computer system or a dedicated machine), or a combination of both.

Processing logic enumerates over N paths in the circuit (processing block 310). In one embodiment, a user selects these N paths. In an alternative embodiment, processing logic selects these N paths based on performance data from the libraries. Processing logic may use the performance data from the libraries to identify N paths in the circuit that are most likely to have the worst slack among all paths in the circuit. In some embodiments, the paths are enumerated in decreasing worst slack order. Thus, the mean values of the worst slack decrease. However, the standard deviations of the worst slack may not follow a specific pattern. In some embodiments, enumerating over a small number of paths (such as 50, 100, etc.) is enough.

Then for each of the N paths, processing logic determines the worst slack at the predetermined confidence level (processing block 320). Details of one embodiment of a process to determine the worst slack at the predetermined confidence level have been described above. Finally, processing logic outputs the worst among the worst slacks over the N paths to be the worst slack of the circuit at the predetermined confidence level (processing block 330).

Intra-Chip Process Variation

As mentioned before, the mechanism for calculating minimum and maximum arc delays on a chip may be specified to model intra-chip process variation. Minimum and maximum delays can be constant deviations from the nominal values (such as constants specified with set_timing_derate or set_scale_delays commands), or variable deviations (such as deviations that depend upon operating parameters or operating conditions). For constant deviations, a delay does not change with changes in operating parameters. For variable deviations, a delay changes with changes in operating parameters. In some embodiments, delay distribution due to intra-chip variation is normal (also known as Gaussian). For a given intra-chip process variation setup, users may provide constants $k_3$ and $k_4$ to indicate the spread from the mean of the minimum and maximum delays, as shown at the WC inter-chip corner 230 in FIG. 2. Given $k_3$ and $k_4$, the mean and standard deviation of the slack of an arc, $arc_i$, can be determined using the following equations:

$$\mu_{delay,i} - k_3 \sigma_{delay,i} = \text{Delay}_{min};$$

$$\mu_{delay,i} + k_4 \sigma_{delay,i} = \text{Delay}_{max},$$

where $\text{Delay}_{min}$ and $\text{Delay}_{max}$ are minimum and maximum arc delays of delay arc i, respectively.

Unlike inter-chip process variation, where all delays may be fully correlated, intra-chip variation includes independent as well as correlated delay variation components. Factors or coefficients that describe how various delays are correlated are provided by users. For example, a user may specify a single or multiple separate delay correlation coefficients for the minimum delays, the maximum delays, and how the minimum and maximum delays are correlated.

Using the means and standard deviations of various arc delays, their correlation coefficients, and equations (C)-(F), the mean and standard deviation of slack can be calculated from equation (B). In some embodiments, the minimum delays, maximum delays, and minimum-and-maximum delays, have separate correlation coefficients, namely, $r_{min}$, $r_{max}$, and $r_{min\text{-}max}$, respectively. Hence, the mean and standard deviation of slack can be determined using the following equations:

$$\mu_{slack} = \Sigma_i \mu_{Delay\_early,i} - \Sigma_j \mu_{Delay\_late,j} + adj$$

$$\text{Var}_{Delay\_early} = r_{min}(\Sigma \sigma_{Delay\_early,i})^2 + (1-r_{min})(\Sigma \sigma_{Delay\_early,i}^2)$$

$$\text{Var}_{Delay\_late} = r_{max}(\Sigma \sigma_{Delay\_late,j})^2 + (1-r_{max})(\Sigma \sigma_{Delay\_late,j}^2)$$

$$\text{Var}_{Delay\_early} = \sigma_{Delay\_early}^2$$

$$\text{Var}_{Delay\_late} = \sigma_{Delay\_late}^2$$

$$\text{Var}_{slack} = (1 + r_{min\text{-}max})(\sigma_{Delay\_early}^2 + \sigma_{Delay\_late}^2) - r_{min\text{-}max}(\sigma_{Delay\_early} + \sigma_{Delay\_late})^2$$

In some embodiments, CPPR adjustments are provided by excluding delay variation due to delay arcs on clock paths shared by both early and late paths. These delay arcs may be excluded from both mean and standard deviation calculation for slack.

Inter-Chip and Intra-Chip Process Variation

Figure 2:
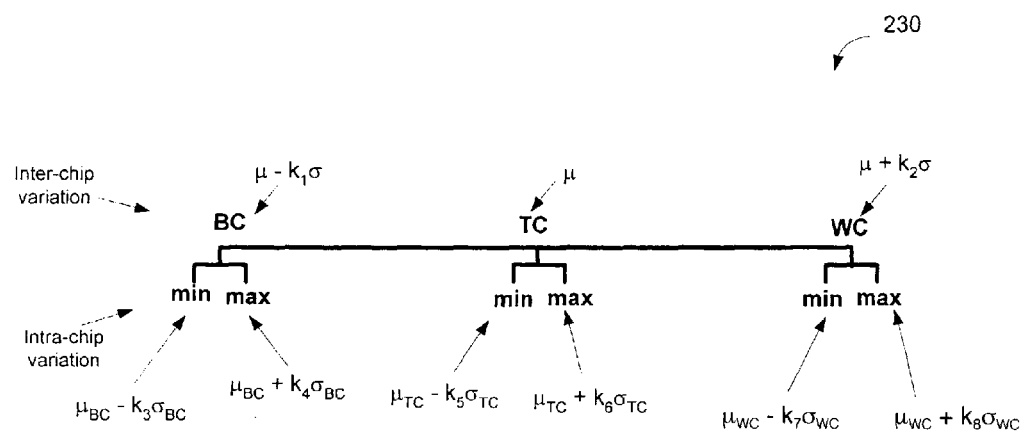
FIG. 2 illustrates one conventional approach to model inter-chip and intra-chip process variation.

As described above, a user can specify intra-chip variations around each of the inter-chip variation design corners (see FIG. 2). In some embodiments, intra-chip variation is specified with constant delay deviation (e.g., with set_timing_derate or set_scale_delays commands). Different portions of a path may be scaled by different constants. For example, early path delays on clock network may be scaled by one constant while late path delays on the clock network may be scaled by another. The mean and standard deviation calculation for slack in this case is substantially similar to the case of inter-chip variation. This is because on-chip process variation here is modeled by multiplying nominal delays calculated at various inter-chip process variation corners by constants. Nominal delays multiplied by constants are still fully correlated. In other words, the slack of a path can be expressed as follows (which follows from equation (B)):

$$\text{Slack} = \Sigma_i C_i \text{Delay}_{early,i} - \Sigma_j C_j \text{Delay}_{late,j} + adj,$$

where $\text{Delay}_{early,i}$ and $\text{Delay}_{late,j}$ are delays calculated at an inter-chip variation corner. Since all of these delays are fully correlated, the mean and standard deviation for a path slack while taking both inter-chip and intra-chip process variations into account may be substantially similar to the results presented above with respect to inter-chip variation.

Figure 3B:
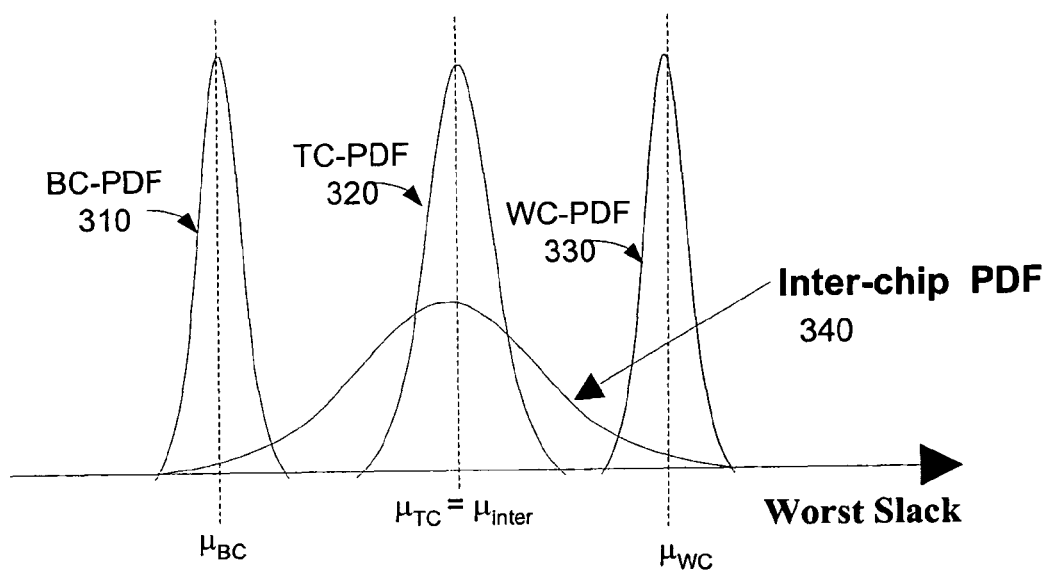
FIG. 3B illustrates some exemplary PDFs of the inter-chip and intra-chip worst slack distribution.

Intra-chip variation can be modeled by variable delay deviations around nominal delays, as specified by minimum and/or maximum operating conditions or operating parameters. In one embodiment, Probability Distribution Functions (PDFs) modeling intra-chip variation around each of the inter-chip variation corners are determined, such as the PDFs 310-330 in FIG. 3B. Then the PDFs 310-330 modeling intra-chip process variation are used to determine the inter-chip PDF 340, as shown in FIG. 3B. In some embodiments, slacks at any user specified confidence level can be determined from these PDFs as explained below.

First of all, from the specified intra-chip process variations at the various inter-chip process variation corners, the PDFs for intra-chip process variations may be determined, as described in the section discussing intra-chip process variation. A user may also indicate at which inter-chip process variation corners the intra-chip process variations are specified. For example, WC intra-chip process variation can be specified at the $\mu + k_1 \sigma$ corner of inter-chip process variation. From this information, distribution modeling inter-chip process variation may be determined, as detailed above in the section on inter-chip process variation.

Distribution for intra-chip process variation at any point on the inter-chip variation PDF 340 (not just at BC, TC and WC points) can be determined from the BC, TC and WC PDFs 310-330. For example, given intra-chip standard deviations $\sigma_{BC}$, $\sigma_{TC}$, and $\sigma_{WC}$, standard deviation of the intra-chip process variation at a desired inter-chip variation corner can be found by various statistical analysis approaches, such as linear regression. Linear regression is a statistical analysis approach to model a relationship between two variables by fitting a linear equation to the observed data of the two variables. Hence, these inter-chip and intra-chip PDFs can be used to compute values of performance parameters at different user-specified confidence levels. A desired predetermined confidence level may be specified by a user such that it is a user-specified confidence level.

Figure 4:
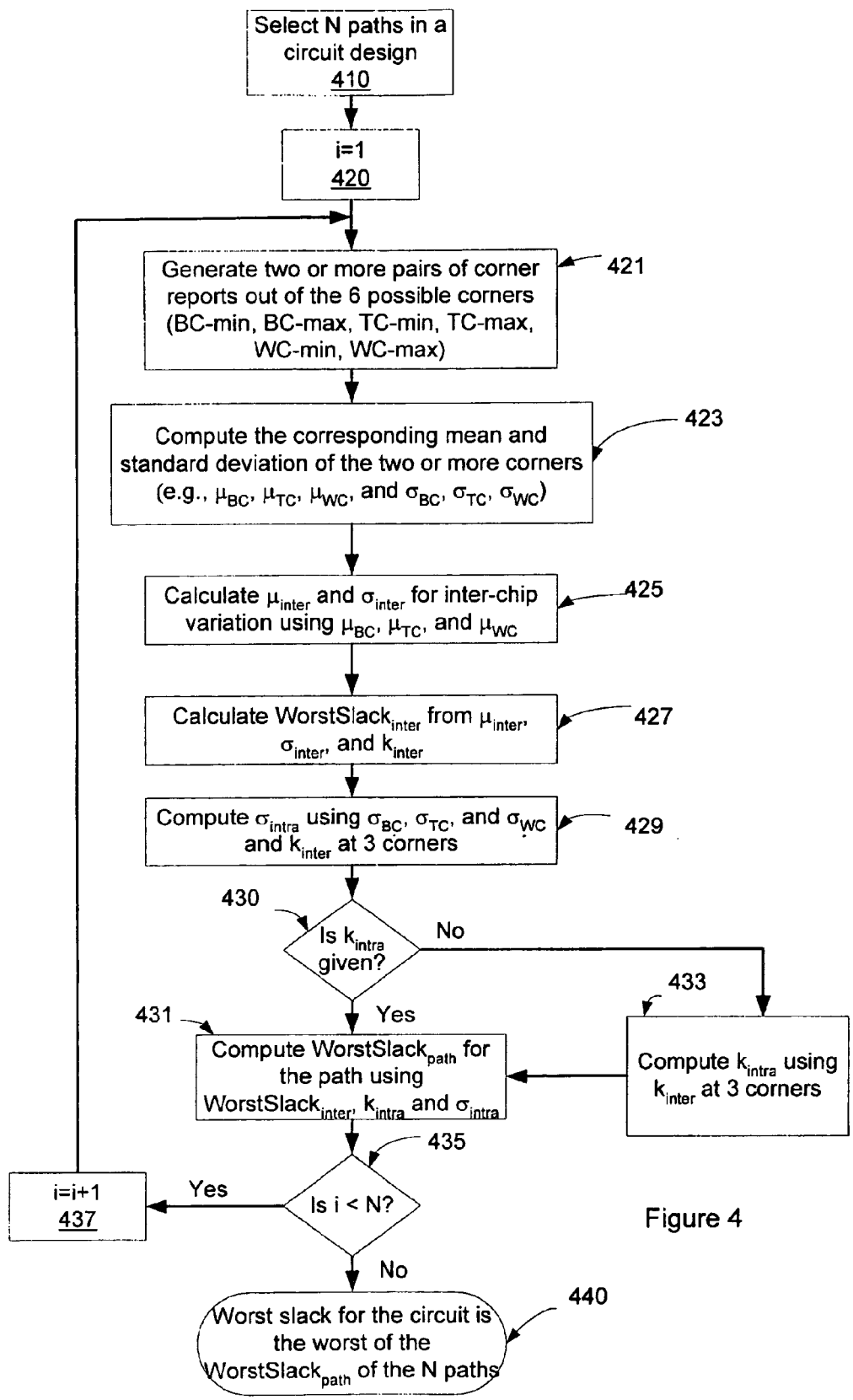
FIG. 4 illustrates a flow diagram of one embodiment of a process to determine the worst slack of a circuit at a predetermined confidence level associated with an inter-chip constant and an intra-chip constant.

FIG. 4 illustrates a flow diagram of one embodiment of a process to calculate an exemplary performance parameter, the worst slack, of a circuit at a predetermined confidence level associated with an inter-chip constant, $k_{inter}$, and an intra-chip constant, $k_{intra}$. The process may be performed by processing logic that may comprise hardware (e.g., circuitry, dedicated logic, etc.), software (such as an EDA tool, operable to run on a general-purpose computer system or a dedicated machine), or a combination of both. It should be understood that the worst slack is merely used as an example to illustrate the concept. The technique described below may be applied to compute other performance parameters.

Initially, N paths in the circuit are selected (processing block 410). In some embodiments, processing logic selects these N paths automatically based on some predetermined criteria, such as how timing-critical the paths are. Furthermore, a user may be allowed to specify the criteria to use in selecting the N paths in some embodiments. Alternatively, a user is prompted to manually select the N paths. Then processing logic analyzes each of the N paths. In one embodiment, processing logic starts with the first path by setting an index, i, to 1 (processing block 420).

For each path, processing logic performs various operations to determine the worst slack of the path at $k_{inter}$ and $k_{intra}$. Note that $k_{inter}$ is provided by the user, but $k_{intra}$ may or may not be provided by the user. Initially, processing logic generates at least two pairs of corner reports using data from the libraries at the two process corners (processing block 421). Typically, the libraries at the at least two process corners may be chosen out of six libraries, including BC minimum, BC maximum, TC minimum, TC maximum, WC minimum, and WC maximum, which are generally available from foundries or library vendors. In some embodiments, the corner reports include performance data at the corresponding process corners, such as $WorstSlack_{BC-min}$, $WorstSlack_{BC-max}$, $WorstSlack_{TC-min}$, $WorstSlack_{TC-max}$, $WorstSlack_{WC-min}$, and $WorstSlack_{WC-max}$, as well as the values of k corresponding to the confidence levels at the respective process corners. Note that the confidence levels at the BC, TC, and WC corners are different from the confidence levels associated with $k_{inter}$ and $k_{intra}$. It should be apparent that, otherwise, one can simply find the worst slack from one of the existing BC, TC, and WC libraries.

Processing logic computes the corresponding mean and standard deviation of the two process corners, such as $\mu_{BC}$, $\mu_{TC}$, $\mu_{WC}$, $\sigma_{BC}$, $\sigma_{TC}$, and $\sigma_{WC}$, from the libraries (processing block 423). For example, suppose the two process corners are BC and TC, then $\mu_{BC}$, $\mu_{TC}$, $\sigma_{BC}$, and $\sigma_{TC}$ are computed using the following equations:

$$\mu_{BC}-k_3\sigma_{BC}=WorStSlack_{BC-min}$$

$$\mu_{BC}+k_4\sigma_{BC}=WorStSlack_{BC-max}$$

$$\mu_{TC}-k_5\sigma_{TC}=WorStSlack_{TC-min}$$

$$\mu_{TC}+k_6\sigma_{TC}=WorStSlack_{TC-max}$$

Processing logic then calculates $\mu_{inter}$ and $\sigma_{inter}$ for inter-chip variation using the means, $\mu_{BC}$, $\mu_{TC}$, and $\mu_{WC}$, from processing block 423 (processing block 425). For example, suppose $\mu_{BC}$ and $\mu_{TC}$ have been computed in processing block 423. Then $\mu_{inter}$ and $\sigma_{inter}$ can be computed using the following equations:

$$\mu_{inter}=\mu_{TC}; \text{ and}$$

$$\mu_{TC}-\mu_{BC}=k_1*\sigma_{inter}.$$

In processing block 427, processing logic computes $WorstSlack_{inter}$ of the current path using $\mu_{inter}$, $\sigma_{inter}$, and $k_{inter}$ according to the following equation:

$$WorstSlack_{inter}=\mu_{inter}+k_{inter}\sigma_{inter}$$

As mentioned above, $k_{inter}$ is provided by the user.

Having completed the computation for inter-chip process variation, processing logic continues the analysis by evaluating intra-chip process variation at the predetermined confidence level. In some embodiments, processing logic computes $\sigma_{intra}$ using $\sigma_{BC}$, $\sigma_{TC}$, and $\sigma_{WC}$ (processing block 429). For example, given $\sigma_{BC}$ corresponding to $k_1$, $\sigma_{TC}$ corresponding to a zero k-factor, and $\sigma_{WC}$ corresponding to $k_2$, processing logic may fit a cure at the above three points and evaluate the curve at $k_{inter}$ to find $\sigma_{intra}$.

Then processing logic checks whether $k_{intra}$ has been given by the user (processing block 430). If not, processing logic computes $k_{intra}$ using $\sigma_{BC}$, $\sigma_{TC}$, and $\sigma_{WC}$ (processing block 433). In some embodiments, processing logic computes $k_{intra}$ in a manner similar to computing $\sigma_{intra}$. For example, given $k_1$ corresponding to $k_4$, a zero k-factor corresponding to $k_6$, and $k_2$ corresponding to $k_8$, processing logic may fit a curve at $k_4$, $k_6$, and $k_8$ and evaluate the curve at $k_{inter}$ to find $k_{intra}$. Then processing logic transitions to processing block 431. Otherwise, if the user has provided $k_{intra}$, processing logic transitions directly from processing block 430 to processing block 431.

In processing block 431, processing logic computes the worst slack for the current path, $WorstSlack_{path}$, using $k_{intra}$ and $\sigma_{intra}$. In one embodiment, $WorstSlack_{path}$ is computed using the following equation:

$$WorstSlack_{path}=WorstSlack_{inter}+/-k_{intra}*\sigma_{intra}$$

Then processing logic checks whether the index, i, is less than N (processing block 435). If so, not all N paths are analyzed. Thus, processing logic may increment i by 1 (processing block 437) and transition to processing block 421 to analyze the next path. Otherwise, processing logic has analyzed all N paths, and thus, processing logic transitions to processing block 440. In one embodiment, processing logic selects the worst $WorstSlack_{path}$ among the N paths to be the worst slack of the circuit at the predetermined confidence level associated with $k_{inter}$ and $k_{intra}$ (processing block 440).

Values of performance parameters determined according to the technique described above are useful in the IC design process. The worst slack of the circuit determined above may be used in making decisions on business and design trade-off. For example, a semiconductor manufacturer may be willing to accept a higher worst slack in order to achieve a better yield in the production of the circuits. Moreover, the above technique eliminates the need to order a new set of libraries at the specific confidence level(s) that are of interest (at least during initial design exploration stage). Thus, both design time and cost of ICs may be reduced using the above technique.

Application of Statistical Static Timing Analysis in EDA

Figure 5:
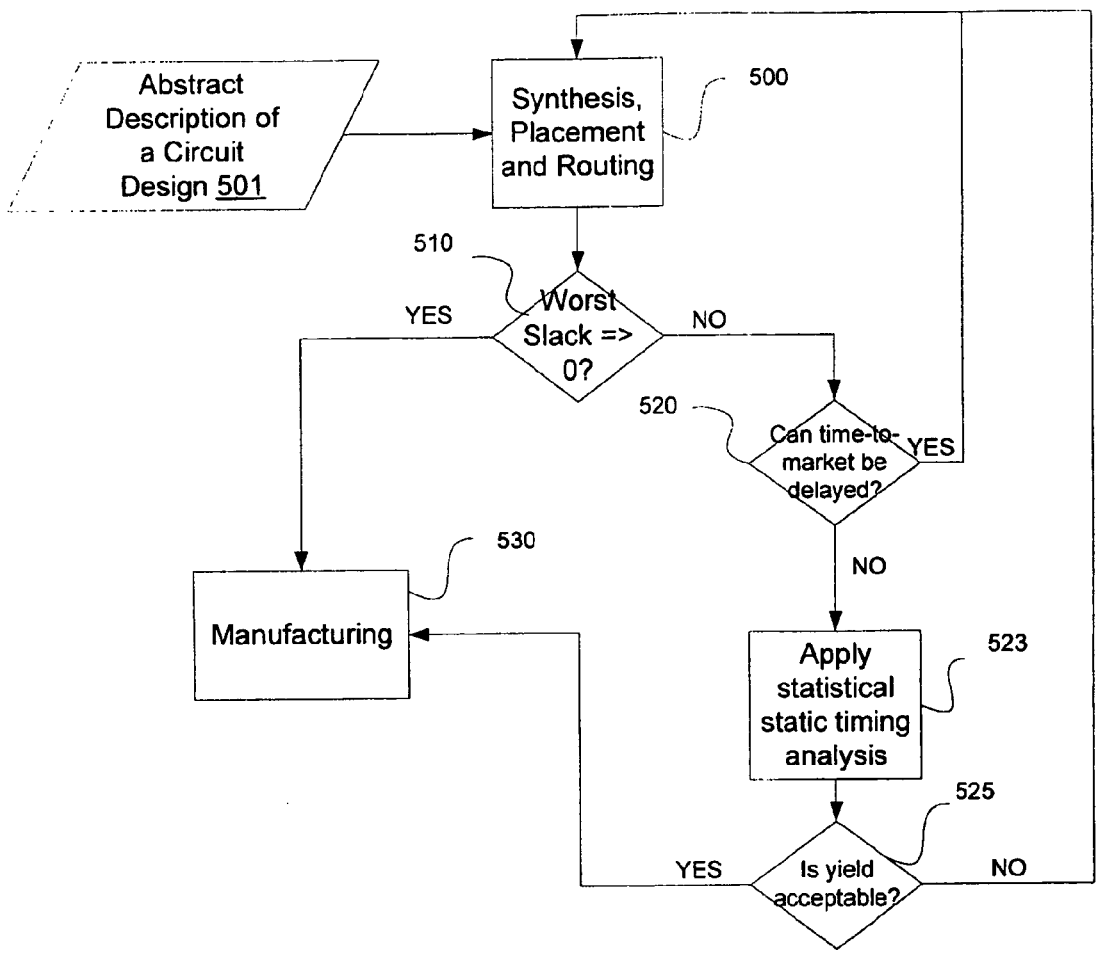
FIG. 5 illustrates an exemplary embodiment of an electronic design automation (EDA) flow usable with one embodiment of the present invention.

In some embodiments, the technique of statistical static timing analysis described above is applied in EDA. FIG. 5 illustrates one embodiment of an EDA flow usable with the current invention. The EDA flow includes various stages that may be implemented by hardware, software, or a combination of both. Note that in different embodiments, the EDA flow may include fewer or more stages than those illustrated in FIG. 5.

Initially, an abstract description 501 of a circuit design is received. The abstract description 501 may be written in a hardware description language (HDL), such as Verilog. The abstract description 501 provides a high-level description of the functionalities of the circuit design. Then synthesis, placement, and routing are performed in stage 500 to generate a physical layout of a circuit design based on the abstract description 501. In some embodiments, synthesis is performed to decide what components to use and how the components are to be connected to each other in a netlist of the circuit design based on performance of the circuit at a predetermined confidence level. The netlist may describe the components (e.g., NAND gates, NOR gates, flip-flops, etc.) used to implement the circuit design and the inter-connection of these components. Then placement and routing may be performed on the netlist to determine the physical placement and the routing of the components in the netlist on silicon.

Then the worst slack of the circuit design is checked at stage 510. If the worst slack of the circuit design is greater than or equal to zero, then the physical layout of the circuit design is provided to manufacturing at stage 530 for fabricating semiconductor chips of the circuit design.

If the worst slack of the circuit design is less than zero, then it is checked whether the time-to-market can be delayed at stage 520. If the time-to-market can be delayed, then the flow may transition back to stage 500 to repeat the synthesis, placement, and routing to try to achieve a worst slack greater than or equal to zero. Otherwise, applying statistical static timing analysis described above to the circuit design to find a reduced level of yield (e.g., 95%) that may achieve a worst slack greater than or equal to zero without ordering new libraries at stage 523. Applying statistical static timing analysis described above is applied to find a reduced yield is generally faster and cheaper than ordering sets of new libraries in order to determine which level of yield may achieve a worst slack greater than or equal to zero. In some embodiments, once the reduced level of yield is found, a set of libraries corresponding to the reduced level of yield may nevertheless be ordered so that more detailed timing verification can be done before signing off the circuit design.

At stage 525, it is checked whether the reduced yield is acceptable. If the reduced yield is acceptable, the physical layout corresponding to the reduced level of yield may be provided to manufacturing at stage 530 for fabricating semiconductor chips of the circuit design. Otherwise, the flow may transition back to stage 500 to repeat the synthesis, placement, and routing to try to achieve a worst slack greater than or equal to zero.

Figure 6:
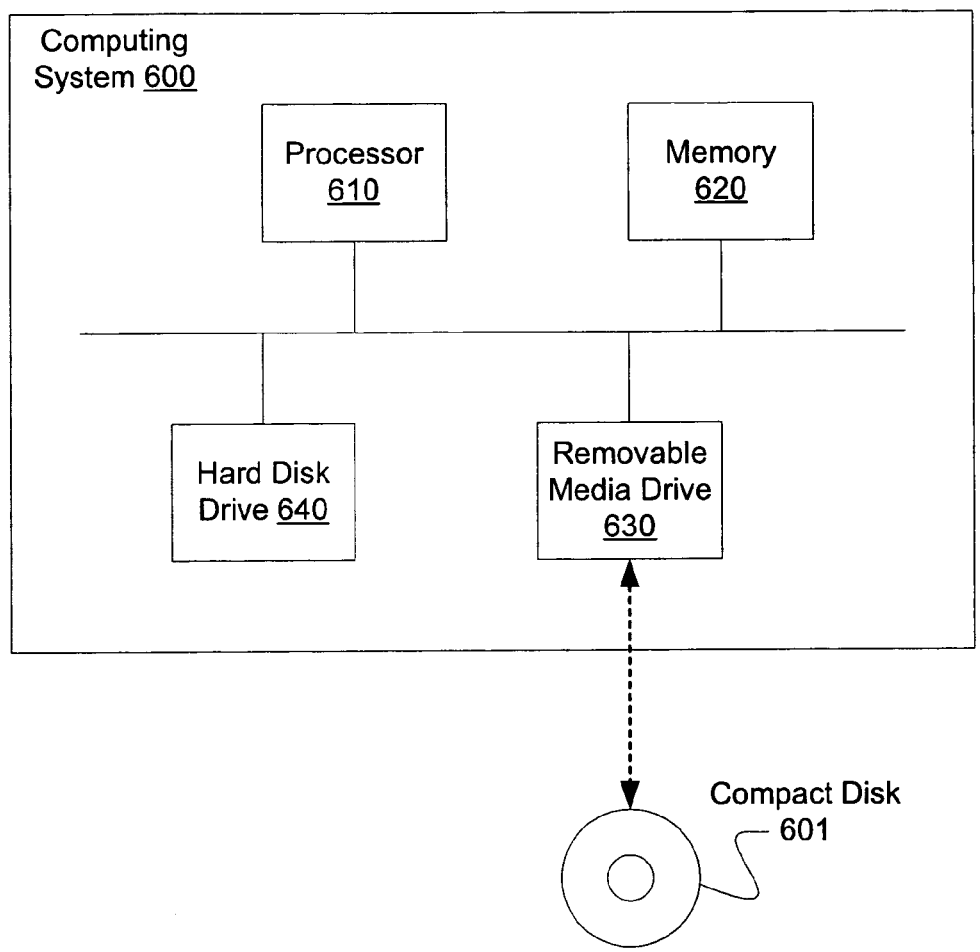
FIG. 6 illustrates an exemplary embodiment of a computing system usable with one embodiment of the present invention.

FIG. 6 illustrates a computing system that may be used to perform some or all of the processes according to some embodiments of the current invention. In one embodiment, the computing system 600 includes a processor 610 and a memory 620, a removable media drive 630, and a hard disk drive 640. In one embodiment, the processor 610 executes instructions residing on a machine-readable medium, such as the hard disk drive 540, a movable medium (e.g., a compact disk 601, a magnetic tape, etc.), or a combination of both. The instructions may be loaded from the machine-readable medium into the memory 620, which may include Random Access Memory (RAM), dynamic RAM (DRAM), etc. The processor 610 may retrieve the instructions from the memory 620 and execute the instructions to perform operations described above.

Note that any or all of the components and the associated hardware illustrated in FIG. 6 may be used in various embodiments of the system 600. However, it should be appreciated that other configurations of the system 600 may include more or less devices than those shown in FIG. 6.

Some portions of the preceding detailed description have been presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A system comprising:
   a processor; and
   a memory to store instructions, when executed, will perform operations comprising:
      receiving a predetermined confidence level from a user indicating a desired percentage of circuits meeting a predetermined specification when fabricated;
      retrieving performance data from a plurality of libraries associated with at least two different process corners; and
      estimating performance of a circuit at the predetermined confidence level using the performance data retrieved without using libraries associated with a process corner corresponding to the predetermined confidence level.

2. The system of claim 1, wherein
   estimating the performance of the circuit at the predetermined confidence level using the performance data retrieved comprises:
      determining a plurality of values of a performance parameter for a respective plurality of paths in the circuit using statistical analysis of the performance data.

3. The system of claim 2, wherein
the performance parameter is a worst slack of each of the plurality of paths.

4. The system of claim 2, wherein
determining the plurality of values of the performance parameter comprises:
determining an inter-chip process variation and an intra-chip process variation of the performance parameter for each of the respective plurality of paths.

5. The system of claim 1, wherein
the at least two different process corners are selected from a best case process corner, a typical case process corner, and a worst case process corner.

6. The system of claim 1, wherein
the desired percentage of circuits meeting the predetermined specification when fabricated is a desired yield for a circuit fabricated in a fabrication process.

7. A non-transitory machine-readable medium that stores instructions that, if executed by a processor, will perform operations comprising:
receiving a predetermined confidence level from a user indicating a desired percentage of circuits meeting a predetermined specification when fabricated;
retrieving performance data from a plurality of libraries associated with at least two different process corners; and
estimating performance of a circuit at the predetermined confidence level using the performance data retrieved without using libraries associated with a process corner corresponding to the predetermined confidence level.

8. The non-transitory machine-readable medium of claim 7, wherein
the estimating of the performance of the circuit at the predetermined confidence level using the performance data retrieved includes instructions stored in the non-transitory machine-readable medium that when executed by the processor perform:
determining a plurality of values of a performance parameter for a respective plurality of paths in the circuit using statistical analysis of the performance data.

9. The non-transitory machine-readable medium of claim 8, wherein
the performance parameter is a worst slack of each of the plurality of paths.

10. The non-transitory machine-readable medium of claim 9, wherein
the determining of the plurality of values of the performance parameter includes instructions stored in the non-transitory machine-readable medium that when executed by the processor perform:
determining an inter-chip process variation and an intra-chip process variation of the performance parameter for each of the respective plurality of paths.

11. The non-transitory machine-readable medium of claim 7, wherein
the at least two different process corners are selected from a best case process corner, a typical case process corner, and a worst case process corner.

12. The non-transitory machine-readable medium of claim 7, wherein
the desired percentage of circuits meeting the predetermined specification when fabricated is a desired yield for a circuit fabricated in a fabrication process.

* * * * *